(12) United States Patent
Takeda

(10) Patent No.: US 7,745,058 B2
(45) Date of Patent: Jun. 29, 2010

(54) NON-AQUEOUS SOLVENT, NON-AQUEOUS ELECTROLYTE COMPOSITIONS, AND NON-AQUEOUS ELECTROLYTE SECONDARY BATTERY

(75) Inventor: Yukifumi Takeda, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/668,374

(22) Filed: Jan. 29, 2007

(65) Prior Publication Data

US 2007/0178386 A1 Aug. 2, 2007

(30) Foreign Application Priority Data

Feb. 2, 2006 (JP) ............................. 2006-026115

(51) Int. Cl.
*H01M 6/16* (2006.01)

(52) U.S. Cl. .................. 429/331; 429/330; 429/332; 429/163; 429/303; 429/306; 252/364

(58) Field of Classification Search ................. 429/331, 429/330, 332, 163, 303, 306; 252/364
See application file for complete search history.

(56) References Cited

U.S. PATENT DOCUMENTS

| 5,521,027 | A | 5/1996 | Okuno et al. | |
|---|---|---|---|---|
| 5,525,443 | A | 6/1996 | Okuno et al. | |
| 6,399,241 | B1 | 6/2002 | Hara et al. | |
| 2004/0028996 | A1* | 2/2004 | Hamamoto et al. | 429/231.1 |
| 2006/0061330 | A1* | 3/2006 | Sato et al. | 320/125 |
| 2006/0204858 | A1* | 9/2006 | Hasumi et al. | 429/342 |
| 2007/0111104 | A1* | 5/2007 | Shibuya | 429/303 |
| 2007/0134546 | A1* | 6/2007 | Hashimoto | 429/49 |

FOREIGN PATENT DOCUMENTS

| JP | 03123780 | | 5/1991 |
|---|---|---|---|
| JP | 04-332479 | | 11/1992 |
| JP | 02780480 | | 7/1998 |
| JP | 10-321258 | | 12/1998 |
| JP | 2000-133215 | | 5/2000 |
| JP | 2002-025621 | | 1/2002 |
| JP | 2003-100293 | | 4/2003 |
| JP | 3482591 | | 10/2003 |
| JP | 2004-055509 | | 2/2004 |
| JP | 2004-259677 | * | 9/2004 |
| JP | 2004-303544 | | 10/2004 |
| JP | 2005-158302 | | 6/2005 |
| JP | 2006-066341 | | 3/2006 |

OTHER PUBLICATIONS

Japanese Office Action issued on Oct. 2, 2009, for corresponding Japanese Patent Application 2006-026115.

* cited by examiner

*Primary Examiner*—Laura S Weiner
(74) *Attorney, Agent, or Firm*—K&L Gates LLP

(57) ABSTRACT

A non-aqueous solvent is provided that includes ethylene carbonate in a range from 5% or more to less than 60%, propylene carbonate of 40% or less, and diethyl carbonate of 40% or more, as mass ratios. The non-aqueous electrolyte compositions are formed by further adding an electrolytic salt and, if necessary, unsaturated cyclic carbonic ester and a high molecular compound into the non-aqueous solvent. A non-aqueous electrolyte secondary battery is formed by using the non-aqueous electrolyte compositions.

4 Claims, 2 Drawing Sheets

NON-AQUEOUS SOLVENT, NON-AQUEOUS ELECTROLYTE COMPOSITIONS, AND NON-AQUEOUS ELECTROLYTE SECONDARY BATTERY

CROSS REFERENCES TO RELATED APPLICATIONS

The present application claims priority to Japanese Patent Application JP 2006-026115 filed in the Japanese Patent Office on Feb. 2, 2006, the entire contents of which is being incorporated herein by reference.

BACKGROUND

The present disclosure relates to a non-aqueous solvent, electrolyte compositions using the non-aqueous solvent, and a non-aqueous electrolyte secondary battery. More particularly, the present disclosure relates to a non-aqueous solvent containing ethylene carbonate, propylene carbonate, and diethyl carbonate, non-aqueous electrolyte compositions containing the non-aqueous solvent and an electrolytic salt, and a lithium ion non-aqueous electrolyte secondary battery using the non-aqueous electrolyte compositions.

In recent years, many portable electronic apparatuses such as camera-integrated type VTR (video tape recorder), digital camera, cellular phone, personal digital assistant, notebook-sized computer, and the like have been put into the market. Miniaturization and a light weight of such a portable electronic apparatus have been realized. As portable power sources for such electronic apparatuses, studies and development to improve an energy density are vigorously being progressed with respect to batteries, particularly, secondary batteries.

Among them, a lithium ion secondary battery in which carbon is used for an anode active material, a lithium-transition metal composite oxide is used for a cathode active material, and a carbonic ester mixture is used for an electrolytic solution has widely been put into practical use because a large energy density can be obtained as compared with a lead battery and a nickel cadmium battery as non-aqueous system electrolytic solution secondary batteries in the related art (for example, refer to JP-A-1992(Heisei 4)-332479).

Particularly, as for a laminate battery using an aluminum laminate film for a sheathing, an energy density is large because the laminate battery is light (for example, refer to the Official Gazette of Japanese Patent No. 3482591).

In such a laminate battery, if a polymer swelled by an electrolytic solution is used, since a deformation of the battery can be suppressed, a laminate polymer battery is also widely used (for example, refer to JP-A-2000-133215).

However, since a density of an electrode active materials provided for each of electrodes is increasing and a gap between them is decreasing in association with the recent realization of a high capacitance of a battery, in an electrolytic solution in the related art, conductivity is insufficient and lithium ions are difficult to move between the electrode.

There is, consequently, such a problem that battery performance deteriorates largely and a discharge capacitance maintaining ratio at the time of the repetitive charge and discharge decreases.

It is, therefore, desirable to provide a non-aqueous solvent which can improve a discharge capacitance maintaining ratio at the time of the repetitive charge and discharge, electrolyte compositions using such a non-aqueous solvent, and a non-aqueous electrolyte secondary battery.

SUMMARY

According to an embodiment, there is provided a non-aqueous solvent containing ethylene carbonate in a range from 5% or more to less than 60%, propylene carbonate of 40% or less, and diethyl carbonate of 40% or more as a mass ratio, respectively.

According to another embodiment, there is provided a non-aqueous electrolyte compositions containing: an electrolytic salt; and a non-aqueous solvent containing ethylene carbonate in a range from 5% or more to less than 60%, propylene carbonate of 40% or less, and diethyl carbonate of 40% or more as a mass ratio, respectively.

According to another embodiment, there is provided a non-aqueous electrolyte secondary battery comprising: a cathode containing cathode active material and an anode containing anode active material, each active material doping and dedoping lithium ions; non-aqueous electrolyte compositions; a separator; and a sheathing member enclosing them, wherein the non-aqueous electrolyte compositions contain an electrolytic salt and a non-aqueous solvent containing ethylene carbonate in a range from 5% or more to less than 60%, propylene carbonate of 40% or less, and diethyl carbonate of 40% or more as a mass ratio, respectively.

According to the embodiment, since ethylene carbonate, propylene carbonate, and diethyl carbonate are used at a predetermined ratio, it is possible to provide a non-aqueous solvent which can prevent a decrease in discharge capacitance maintaining ratio at the time of the repetitive charge and discharge, non-aqueous electrolyte compositions using such a solvent, and a non-aqueous electrolyte secondary battery.

Other features and advantages are apparent from the following description taken in conjunction with the accompanying drawings, in which like reference characters designate the same or similar parts throughout the figures thereof.

Additional features and advantages are described herein, and will be apparent from, the following Detailed Description and the figures.

DETAILED DESCRIPTION

Figure 1:
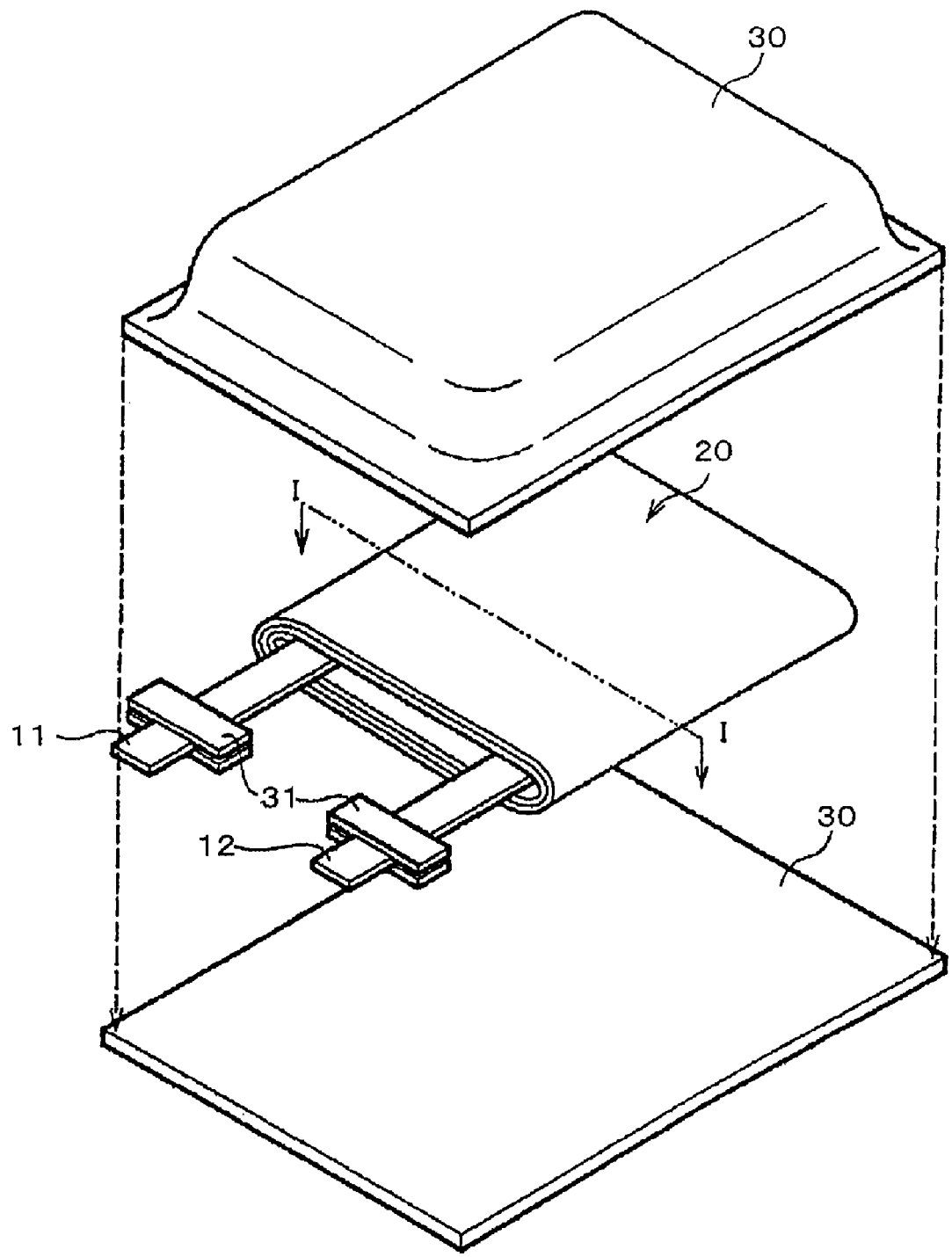
FIG. 1 is an exploded perspective view showing an example of a laminate type battery according to an example of a non-aqueous electrolyte secondary battery of an embodiment.

A non-aqueous solvent and non-aqueous electrolyte composition is described in detail hereinbelow. In the specification, [%] indicates a mass percentage unless otherwise specified.

As mentioned above, the non-aqueous solvent contains ethylene carbonate in a range from 5% or more to less than 60%, propylene carbonate of 40% or less, and diethyl carbonate of 40% or more. The non-aqueous electrolyte compositions contain the non-aqueous solvent and an electrolytic salt and are preferably used for a lithium ion non-aqueous electrolyte secondary battery.

The solvent containing ethylene carbonate, propylene carbonate, and diethyl carbonate at a predetermined ratio contributes to improve conductivity of an electrolytic solution (non-aqueous electrolyte compositions) and can improve a discharge capacitance maintaining ratio at the time of the repetitive charge and discharge.

In a battery such as an aluminum laminate battery or the like using a laminate film as a sheathing member, since the adhesion performance between electrodes is difficult to obtain due to a deformation in association with the repetitive charge and discharge, there is a case where the discharge capacitance maintaining ratio deteriorates. However, since a degree of freedom of the lithium ions also increases in association with the improvement of conductivity of the electrolytic solution, a deformation of the laminate battery that is caused by the repetitive charge and discharge can be suppressed. A decrease in discharge capacitance maintaining ratio can be suppressed.

Generally, as a non-aqueous solvent which is used in the non-aqueous electrolyte secondary battery, there is used a mixture solvent of: a solvent of a high dielectric constant such as butylene carbonate, vinylene carbonate, 4-fluoro-1,3-dioxorane-2-on (fluoro ethylene carbonate), 4-chloro-1,3-dioxorane-2-on (chloro ethylene carbonate), trifluoro methylethylene carbonate, or the like; and a solvent of a low viscosity such as chain-like carbonic ester such as dimethyl carbonate, methylethyl carbonate, methylpropyl carbonate, or the like, chain-like carboxylate ester such as methyl acetate, ethyl acetate, methyl propionate, ethyl propionate, methyl butyric acid, methyl isobutyric acid, trimethyl methyl acetate, trimethyl ethyl acetate, or the like, chain-like amide such as N,N-dimethyl acetamide or the like, chain-like carbamate ester such as N,N-diethyl methyl carbamate, N,N-diethyl ethyl carbamate, or the like, ether such as 1,2-dimethoxy ethane, tetrahydrofuran, tetrahydropyran, 1,3-dioxorane, or the like, etc. In the invention, ethylene carbonate and propylene carbonate as solvents of the high dielectric constant are used together with diethyl carbonate as a solvent of the low viscosity.

In an embodiment, a content of ethylene carbonate contained in the non-aqueous solvent is set to a value ranging from 5% or more to less than 60%. That is, if the content of ethylene carbonate is less than 5%, a degree of dissociation of the lithium ions is low, causing a decrease in a degree of electric conductance of the electrolytic solution. On the contrary, if the content of ethylene carbonate is equal to or larger than 60%, since a viscosity of the electrolytic solution increases, a degree of freedom of the lithium ions decreases, causing the decrease in the degree of electric conductance of the electrolytic solution. It is preferable to set the content of ethylene carbonate in the non-aqueous solvent to a value ranging from 20 to 40%.

In an embodiment, a content of propylene carbonate is 40% or less. This is because if the content of propylene carbonate exceeds 40%, since a ratio of the solvent of the high viscosity containing propylene carbonate and ethylene carbonate increases, the degree of electric conductance of the electrolytic solution decreases. It is more preferable to set the content of propylene carbonate in the non-aqueous solvent to a value ranging from 5 to 30%.

In an embodiment, a content of diethyl carbonate is 40% or more. That is, if the content of diethyl carbonate is less than 40%, since the viscosity of the electrolytic solution is high and lithium ions are difficult to move, the degree of electric conductance of the electrolytic solution decreases.

It is preferable to set the content of diethyl carbonate in the non-aqueous solvent to a value ranging from 40 to 70%.

In an embodiment, the non-aqueous electrolyte compositions contain an electrolytic salt and the non-aqueous solvent containing ethylene carbonate, propylene carbonate, and diethyl carbonate as essential components. A compound other than those components can be also added.

Specifically speaking, unsaturated cyclic carbonic ester can be mentioned. That is, cyclic carbonic ester having a multiple bond between carbon and carbon of a ring, for example, cyclic carbonic ester having a double bond such as vinylene carbonate or vinylethylene carbonate can be mentioned. By adding a small amount of one or both of those unsaturated cyclic carbonic ester, a film coating is formed on the anode. A side reaction with the electrolytic solution (non-aqueous electrolyte compositions) can be suppressed, and the discharge capacitance maintaining ratio at the time of the repetitive charge and discharge can be further improved.

It is preferable to set an additional amount of unsaturated cyclic carbonic ester to a value within a range from 0.1 to 2% as a content in the non-aqueous solvent. This is because there is such a tendency that if it is less than 0.1%, a sufficient film coating is difficult to be formed on the anode, repetitive charging and discharging characteristics of the battery deteriorate. Also, if it exceeds 2%, particularly, expansion of the battery upon preservation at a high temperature increases by a cracked gas of a surplus additive agent.

It is also possible to construct in such a manner that a predetermined high molecular compound is added and the high molecular compound is swelled by the non-aqueous electrolyte compositions, thereby allowing the non-aqueous electrolyte compositions to be dipped or held into the high molecular compound.

By forming a three-dimensional network structure in the battery by using the non-aqueous electrolyte compositions, the adhesion performance between the electrodes is improved, and the deterioration of the discharge capacitance maintaining ratio can be further effectively suppressed.

As such a high molecular compound, for example, polyvinyl formal . . . (1), polyacrylic acid ester . . . (2), and polyvinylidene fluoride . . . (3) expressed by the following chemical formulae (1) to (3), and the like can be mentioned.

[Chemical Formula 1]

(1)

[Chemical Formula 2]

(2)

where,

R: $C_nH_{2n-1}O_m$ (n=integer of 1 to 8, m=integer of 0 to 4)

N: polymerization degree (preferably, N=350 to 1000)

In this instance, if N is less than 350, since the sufficient three-dimensional network structure is not formed, the non-aqueous electrolyte compositions are not dipped or held into the high molecular compound. If N exceeds 1000, since an amount of non-aqueous electrolyte compositions to the high molecular compound is insufficient, there is such a tendency that the high molecules are not sufficiently swelled, causing a deterioration of the battery characteristics.

[Chemical Formula 3]

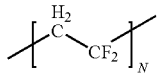

(3)

It is preferable to set an additional amount of the high molecular compound to the separator ranging from 1 to 5 g/m$^2$. If the addition amount of the high molecular compound is less than 1 g/m$^2$, the electrolytic solution is difficult to be sufficiently held in the high molecular network structure, causing a deterioration of the repetitive charging and discharging efficiency. On the contrary, if the additional amount exceeds 5 g/m$^2$, a battery thickness increases and the battery characteristics deteriorate in association with an increase in impedance in the battery.

In an embodiment, as an electrolytic salt constructing the non-aqueous electrolyte compositions, an electrolytic salt which is dissolved and dispersed into the foregoing non-aqueous solvent and produces ions is used. Although lithium phosphate hexafluoride (LiPF$_6$) can be preferably used, the electrolytic salt is not limited to it.

That is, it is possible to use: inorganic lithium salt such as lithium borate tetrafluoride (LiBF$_4$), lithium arsenate hexafluoride (LiAsF$_6$), lithium antimonate hexafluoride (LiSbF$_6$), lithium perchlorate (LiClO$_4$), lithium aluminum acid tetrachloride (LiAlCl$_4$), or the like; a lithium salt of a perfluoro alkane sulfonate derivative such as lithium trifluoro methane sulfonate (LiCF$_3$SO$_3$), lithium bis (trifluoro methane sulfone) imide (LiN(CF$_3$SO$_2$)$_2$), lithium bis (pentafluoro ethane sulfone) imide (LiN(C$_2$F$_5$SO$_2$)$_2$), lithium tris (trifluoro methane sulfone) mechide (LiC(CF$_3$SO$_2$)$_3$), or the like; and the like. One kind of them can be solely used or a combination of two or more kinds of them can be also used.

It is preferable to set a content of such an electrolytic salt to 0.7 to 1.2 mol per solvent of 1 kg. This is because if it is less than 0.7 mol/(solvent kg), the degree of electric conductance of the electrolytic solution decreases due to the lack of lithium ions, causing a deterioration of the repetitive charging and discharging efficiency. On the contrary, if it exceeds 1.2 mol/(solvent kg), a viscosity of the electrolytic solution increases and the degree of electric conductance of the electrolytic solution decreases.

The non-aqueous electrolyte secondary battery is described in detail below.

FIG. 1 is an exploded perspective view showing an example of a laminate type battery according to an example of the non-aqueous electrolyte secondary battery of an embodiment.

In the diagram, this secondary battery is constructed in such a manner that a battery element 20 to which a cathode terminal 11 and an anode terminal 12 have been attached is sealed in a film-shaped sheathing member 30. The cathode terminal 11 and the anode terminal 12 are led out, for example, in the same direction from the inside to the outside of the sheathing member 30. Each of the cathode terminal 11 and the anode terminal 12 is made of a metal material such as aluminum (Al), copper (Cu), nickel (Ni), stainless steel, or the like.

The sheathing member 30 is formed by a rectangular laminate film obtained by adhering, for example, a nylon film, an aluminum foil, and a polyethylene film in this order. The sheathing member 30 is arranged so that, for example, the polyethylene film side and the battery element 20 face each other. Outer edge portions of them are mutually adhered by melt-bonding or with an adhesive agent.

Adhesive films 31 to prevent penetration of the open air are inserted between the sheathing member 30 and the cathode terminal 11 and between the sheathing member 30 and the anode terminal 12, respectively. Each adhesive film 31 is made of a material having adhesion performance to the cathode terminal 11 and the anode terminal 12. For example, if the cathode terminal 11 and the anode terminal 12 are made of the foregoing metal material, it is preferably made of a polyolefin resin such as polyethylene, polypropylene, denatured polyethylene, denatured polypropylene, or the like.

In place of the foregoing laminate film, the sheathing member 30 can be also made by a film having another structure, for example, by a laminate film which does not contain a metal material, a high molecular film such as polypropylene, a metal film, or the like.

A general construction of the sheathing member can be expressed by a laminate structure of a sheathing layer, a metal foil, and a sealant layer (there is a case where each of the sheathing layer and the sealant layer is constructed by a plurality of layers). In the above example, the nylon film corresponds to the sealant layer, the aluminum foil corresponds to the metal foil, and the polyethylene film corresponds to the sheathing layer.

It is sufficient that the metal foil functions as a barrier film having moisture permeability resistance. Not only the aluminum foil but also a stainless steel foil, a nickel foil, a plated iron foil, or the like can be used. The aluminum foil which is thin and light-weighted and excellent in workability can be preferably used.

Constructions which can be used as a sheathing member can be listed as follows in the form of (sheathing layer/metal foil/sealant layer). Ny (nylon)/Al (aluminum)/CPP (casted polypropylene (non-oriented polypropylene)), PET (polyethylene terephthalate)/Al/CPP, PET/Al/PET/CPP, PET/Ny/Al/CPP, PET/Ny/Al/Ny/CPP, PET/Ny/Al/Ny/PE (polyethylene), Ny/PE/Al/LLDPE (linear low-density polyethylene), PET/PE/Al/PET/LDPE (low-density polyethylene), PET/Ny/Al/LDPE/CPP, and the like.

Figure 2:
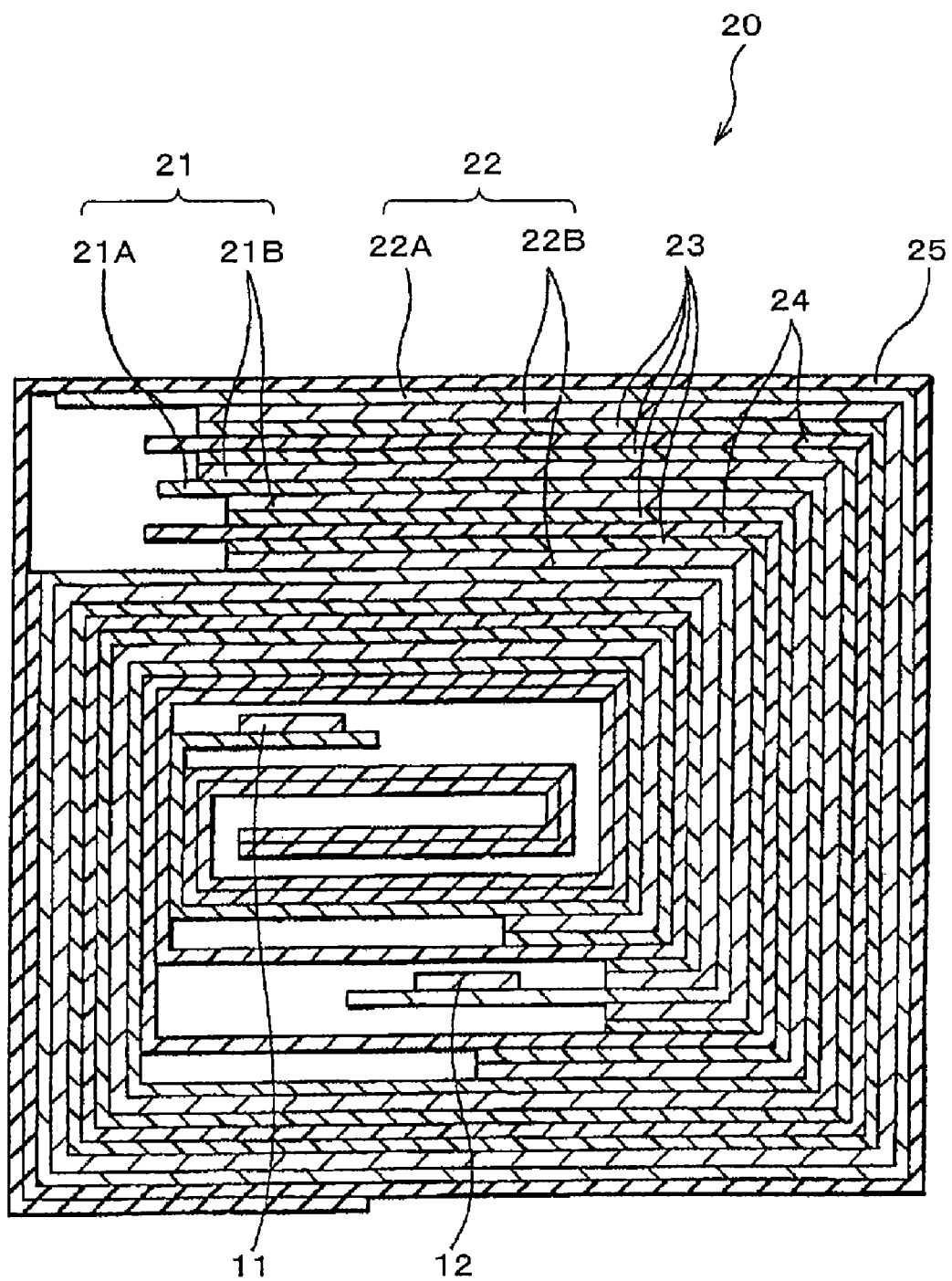
FIG. 2 is a cross sectional view taken along the line I-I of a battery element shown in FIG. 1.

FIG. 2 is a cross sectional view taken along the line I-I of the battery element 20 shown in FIG. 1. In the diagram, the battery element 20 is constructed in such a manner that, for example, a cathode 21 and an anode 22 are arranged so as to face each other through a non-aqueous electrolyte composition layer 23 made of the non-aqueous electrolyte compositions of the invention and through a separator 24 and are wound. An outermost peripheral portion of the battery element 20 is protected by a protecting tape 25.

The cathode 21 has a structure in which, for example, both surfaces or one surface of a cathode collector 21A having a pair of surfaces which face each other are/is covered with a cathode active material layer 21B. In the cathode collector 21A, an exposed portion which is not covered with the cathode active material layer 21B exists in one edge portion in the longitudinal direction. The cathode terminal 11 is attached to this exposed portion.

For example, the cathode collector 21A is made by a metal foil such as aluminum foil, nickel foil, stainless steel foil, or the like.

As a cathode active material, the cathode active material layer 21B contains one, two, or more kinds of cathode materials which can dope and dedope the lithium ions. The cathode active material layer 21B may contain an electroconductive material and a binding agent as necessary.

As a cathode material which can dope and dedope lithium, for example, the following compounds can be mentioned: a lithium non-containing chalcogenide material (particularly, a stratified compound and a spinel type compound) such as sulfur (S), iron disulfide (FeS$_2$), titanium disulfide (TiS$_2$), molybdenum disulfide (MoS$_2$), niobium diselenide (NbSe$_2$), vanadium oxide (V$_2$O$_5$), titanium dioxide (TiO$_2$), manganese dioxide (MnO$_2$), or the like; a lithium-containing compound containing lithium; and conductive high molecular compounds such as polyaniline, polythiofin, polyacetylene, polypyrrole, and the like.

Among them, the lithium-containing compound is preferable because a high voltage and a high energy density can be obtained. As such a lithium-containing compound, for example, a composite oxide containing lithium and a transition metal element and a phosphate compound containing lithium and a transition metal element can be used. From a viewpoint of obtaining the higher voltage, particularly, a compound containing cobalt (Co), nickel (Ni), manganese (Mn), iron (Fe), copper (Cu), zinc (Zn), chromium (Cr), vanadium (V), titanium (Ti), or an arbitrary mixture of them is preferable.

Typically, such a lithium-containing compound is expressed by the following general chemical formula (4) or (5).

$$Li_xM^IO_2 \quad (4)$$

$$Li_yM^{II}PO_4 \quad (5)$$

(where, $M^I$ and $M^{II}$ denote one or more kinds of transition metal elements and values of x and y differ depending on the charging and discharging state of the battery and are generally expressed by $0.05 \leq x \leq 1.10$ and $0.05 \leq y \leq 1.10$)

The compound of formula (4) generally has a stratified structure and the compound of formula (5) generally has an olivin structure.

As specific examples of the composite oxide containing lithium and the transition metal element, the following materials can be mentioned: a lithium cobalt composite oxide (Li$_x$CoO$_2$); a lithium nickel composite oxide (LiNiO$_2$); their solid solution (Li(Ni$_x$Co$_y$Mn$_z$)O$_2$); a lithium nickel cobalt composite oxide (LiNi$_{1-x}$Co$_z$O$_2$ (z<1)); a lithium manganese composite oxide (LiMn$_2$O$_4$) having a spinel type structure; their solid solution (Li(Mn$_{2-x}$Ni$_y$)O$_4$); and the like.

As a specific example of the phosphate compound containing lithium and the transition metal element, for instance, a lithium iron phosphate compound (LiFePO$_4$) having the olivin structure or a lithium iron manganese phosphate compound (LiFe$_{1-v}$MnPO4 (v<1)) each having the olivin structure can be mentioned.

In a manner similar to the cathode 21, for example, the anode 22 has a structure in which anode active material layers 22B are formed on both surfaces or one surface of an anode collector 22A having a pair of surfaces which face each other. In the anode collector 22A, an exposed portion which is not provided with the anode active material layer 22B exists in one edge portion in the longitudinal direction. The anode terminal 12 is attached to this exposed portion.

For example, the anode collector 22A is made by a metal foil such as copper foil, nickel foil, stainless steel foil, or the like.

As an anode active material, the anode active material layer 22B contains one, two, or more kinds of anode material and metal lithium which can dope and dedope the lithium ions. The anode active material layer 22B may contain an electroconductive material and a binder as necessary.

As an anode material which can dope and dedope lithium, for example, a carbon material, a metal oxide, and a high molecular compound can be used. As a carbon material, a graphitization-retardant carbon material, an artificial graphite material, and a graphite system material can be used. More specifically speaking, there are a pyrolytic carbon class, a coke class, a graphite class, a glassy carbon class, an organic high molecular compound baked material, carbon fiber, activated charcoal, carbon black, and the like.

Among them, there is a pitch coke, a needle coke, a petroleum coke, or the like as a coke class. The organic high molecular compound baked material denotes a material obtained by baking a high molecular material such as phenol resin, fran resin, or the like at a proper temperature and carbonating it. As a metal oxide, an iron oxide, a ruthenium oxide, a molybdenum oxide, and the like can be mentioned. As a high molecular material, polyacetylene, polypyrrole, and the like can be used.

Further, as an anode material which can dope and dedope lithium, a material containing, as a component element, at least one kind selected from a metal element and a semimetal element which can form an alloy together with lithium can be also used. The anode material may be a sole element of the metal element or the semimetal element or an alloy or compound of them. A material having one, two, or more kinds of phases of them in at least a part may be also used.

In the invention, in addition to an alloy containing two or more kinds of metal elements, an alloy containing one or more kinds of metal elements and one or more kinds of semimetal elements is also included as an alloy. A non-metal element may be contained. As its texture, there is a solid solution, an eutectic (eutectic mixture), an intermetallic compound, or a texture in which two or more kinds of them coexist.

As such a metal element or semimetal element, for example, tin (Sn), lead (Pb), aluminum (In), indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y) can be mentioned.

Among them, metal elements or semimetal elements of the 14 group in the long period type periodic table are preferable. Silicon or tin is particularly preferable because according to tin or silicon, an ability of doping and dedoping lithium is large and a high energy density can be obtained.

As an alloy of tin, for example, there can be mentioned an alloy containing at least one kind selected from a group including silicon, magnesium (Mg), nickel, copper, iron, cobalt, manganese, zinc, indium, silver, titanium (Ti), germanium, bismuth, antimony, and chromium (Cr) as a second component element other than tin.

As an alloy of silicon, for example, there can be mentioned an alloy containing at least one kind selected from a group including tin, magnesium, nickel, copper, iron, cobalt, manganese, zinc, indium, silver, titanium, germanium, bismuth, antimony, and chromium as a second component element other than silicon.

As a compound of tin or a compound of silicon, for example, a compound containing oxygen (O) or carbon (C) can be mentioned. In addition to tin or silicon, the foregoing second component element may be contained.

A separator 24 is made by an insulative thin film having large ion permeability and predetermined mechanical strength such as porous membrane made of a synthetic resin of a polyolefin system such as polypropylene, polyethylene, or the like, porous membrane made of an inorganic material such as an nonwoven fabric cloth made of ceramics, or the like. The separator can also have a structure in which two or more kinds of them are laminated. Particularly, the separator including the porous membrane of the polyolefin system is preferable because it has excellent separating performance of the cathode 21 and the anode 22 and an internal short-circuit and an open circuit voltage drop can be further reduced.

An example of a manufacturing method of the foregoing secondary battery is described below.

The foregoing laminate type secondary battery can be manufactured as follows.

First, the cathode 21 is formed. For example, in the case of using the particulate cathode active material, the cathode active material and, if necessary, the electroconductive material and the binder are mixed to thereby adjust a cathode mixture and dispersed into a dispersion medium such as N-methyl-2-pyrolidone or the like, thereby forming a cathode mixture slurry.

Subsequently, the cathode collector 21A is coated with the cathode mixture slurry, the slurry is dried, and the cathode collector is compression-molded, thereby forming the cathode active material layer 21B.

The anode 22 is formed. For example, in the case of using the particulate anode active material, the anode active material and, if necessary, the electroconductive material and the binder are mixed to thereby adjust an anode mixture and dispersed into the dispersion medium such as N-methyl-2-pyrolidone or the like, thereby forming an anode mixture slurry. After that, the anode collector 22A is coated with the anode mixture slurry, the slurry is dried, and the anode collector is compression-molded, thereby forming the anode active material layer 22B.

Subsequently, the cathode terminal 11 is attached to the cathode 21 and the anode terminal 12 is attached to the anode 22. After that, the separator 24, cathode 21, separator 24, and anode 22 are sequentially laminated and wound. The protecting tape 25 is adhered to an outermost peripheral portion, thereby forming a winded electrode member. Further, the winded electrode member is sandwiched by the sheathing member 30 and an outermost edge portion excluding a part thereof is thermally melt-bonded, thereby forming the whole body into a sack-shape.

After that, non-aqueous electrolyte compositions containing the chain-like carbonic ester, electrolytic salt such as lithium phosphate hexafluoride or the like, and a non-aqueous solvent such as ethylene carbonate or the like as mentioned above are prepared and injected into the winded electrode member from an opening portion of the sheathing member 30. The opening portion of the sheathing member 30 is thermally melt-bonded and sealed. Thus, the non-aqueous electrolyte composition layer 23 is formed and the secondary battery shown in FIGS. 1 and 2 is completed.

The secondary battery can be also manufactured as follows.

Instead of injecting the non-aqueous electrolyte compositions after the winded electrode member was formed, it is also possible to construct in such a manner that the upper surfaces of the cathode 21 and the anode 22 or the separator 24 are/is coated with the non-aqueous electrolyte compositions and, thereafter, they are wound and sealed into the sheathing member 30.

According to the secondary battery described above, when the battery is charged, the lithium ions are emitted from the cathode active material layer 21B and doped into the anode active material layer 22B through the non-aqueous electrolyte composition layer 23. When the battery is discharged, the lithium ions are emitted from the anode active material layer 22B and doped into the cathode active material layer 21B through the non-aqueous electrolyte composition layer 23.

Since the non-aqueous electrolyte compositions included in the non-aqueous electrolyte composition layer 23 contain the non-aqueous solvent such as ethylene carbonate, propylene carbonate, and diethyl carbonate and its conductivity is improved, upon charging and discharging, battery performance of this secondary battery does not largely deteriorate. The discharge capacitance maintaining ratio at the time of the repetitive charge and discharge is improved.

EXAMPLES

Embodiments are described in further detail below with respect to Examples and Comparisons. However, it should be appreciated that the embodiments are not limited by these Examples.

Specifically speaking, the operation is executed as disclosed in each of the following Examples, the laminate type batteries as shown in FIGS. 1 and 2 are manufactured, and their performance is evaluated.

Example 1

First, a lithium cobalt composite oxide ($LiCoO_2$) of 94 weight parts as a cathode active material, graphite of 3 weight parts as an electroconductive material, and polyvinylidene fluoride (PVdF) of 3 weight parts as a binder are uniformly mixed and N-methyl pyrolidone is added, thereby obtaining a cathode mixture coating solution.

Subsequently, both surfaces of an aluminum foil having a thickness of 20 μm are uniformly coated with the obtained cathode mixture coating solution and the cathode mixture coating solution is dried, thereby forming a cathode mixture layer of 40 mg/cm$^2$ per surface. The cathode mixture layer is cut into a shape having a width of 50 mm and a length of 300 mm, thereby forming the cathode. Further, the cathode terminal is attached.

Subsequently, graphite of 97 weight parts as an anode active material and PVdF of 3 weight parts as a binder are uniformly mixed and N-methyl pyrolidone is added, thereby obtaining an anode mixture coating solution. After that, both surfaces of a copper foil having a thickness of 15 μm serving as an anode collector are uniformly coated with the obtained anode mixture coating solution and the anode mixture coating solution is dried, thereby forming an anode mixture layer of 20 mg/cm$^2$ per surface. The anode mixture layer is cut into a shape having a width of 50 mm and a length of 300 mm, thereby forming the anode. Further, the anode terminal is attached.

As non-aqueous electrolyte compositions, ethylene carbonate (EC), propylene carbonate (PC), diethyl carbonate (DEC), and vinylene carbonate (VC) are mixed at a ratio (mass ratio) of (30:9:60:1) and lithium phosphate hexafluoride is dissolved into the mixture at a ratio of (86:14), thereby forming the non-aqueous electrolyte compositions.

The cathode and anode are laminated through the separator made by a microporous polyethylene film having a thickness of 20 μm and wound. They are inserted into a sack as an example of the sheathing member made by the aluminum laminate film. The non-aqueous electrolyte compositions of 2 g adjusted as mentioned above are injected into the sack and, thereafter, the sack is thermally melt-bonded, thereby forming the laminate type battery. A capacitance of the battery is equal to 700 mAh.

This battery is charged for 12 hours by 700 mA under an environment of 23° C. to a voltage within an upper limit to 4.2V. After that, the charging is stopped for 10 minutes and, subsequently, the battery is discharged until the voltage reaches 3.0V. Table 1 shows a change in discharge capacitance which is obtained when the above operation cycle is repeated 100 times.

By using the non-aqueous solvent containing ethylene carbonate, propylene carbonate, and diethyl carbonate at the predetermined ratio and using the non-aqueous electrolyte compositions added with vinylene carbonate of the predetermined amount as mentioned above, the charge/discharge capacitance maintaining ratio obtained after completion of 100 cycles is improved as compared with that in Comparison 1 using the non-aqueous solvent in which propylene carbonate is not contained as will be described hereinafter.

Examples 2 to 31

The operation similar to that in Example 1 except that the mixture ratio of ethylene carbonate, propylene carbonate, and diethyl carbonate and the addition amount of vinylene carbonate are set to ratios shown in Table 1 is repeated, thereby obtaining laminate type batteries of Examples 2 to 31. A change in discharge capacitance is measured in a manner similar to the above and obtained results are shown in Table 1.

As shown in Table 1, by using the non-aqueous solvent containing ethylene carbonate, propylene carbonate, and diethyl carbonate at the ratio within a predetermined range and using the non-aqueous electrolyte compositions added with vinylene carbonate of an amount within a predetermined range, the charge/discharge capacitance maintaining ratio obtained after completion of 100 cycles is improved as compared with that in Comparisons in which a content of each component is beyond a predetermined range.

Examples 32 to 41

The operation similar to that in Example 1 except that the mixture ratio of ethylene carbonate, propylene carbonate, and diethyl carbonate and the addition amount of vinylethylene carbonate (VEC) are set to ratios shown in Table 1 is repeated, thereby obtaining laminate type batteries of Examples 32 to 41. A change in discharge capacitance is measured in a manner similar to the above and obtained results are shown in Table 1

As shown in Table 1, by using the non-aqueous solvent containing ethylene carbonate, propylene carbonate, and diethyl carbonate at the ratio within a predetermined range and using the non-aqueous electrolyte compositions added with vinylethylene carbonate of an amount within a predetermined range, the charge/discharge capacitance maintaining ratio obtained after completion of 100 cycles is improved as compared with that in Comparisons in which a content of each component is out of a predetermined range.

Examples 42 to 44

The operation similar to that in Example 1 except that the mixture ratio of ethylene carbonate, propylene carbonate, and diethyl carbonate is set to ratios within a predetermined range and the addition amounts of vinylene carbonate and vinylethylene carbonate are set to ratios shown in Table 1 is repeated, thereby obtaining laminate type batteries of Examples 42 to 44. A change in discharge capacitance is measured in a manner similar to the manner above and obtained results are shown in Table 1.

As shown in Table 1, by using the non-aqueous electrolyte compositions in which vinylene carbonate or vinylethylene carbonate is not contained or their addition amounts exceed a preferable range, the charge/discharge capacitance maintaining ratio obtained after completion of 100 cycles is improved as compared with that in Comparisons in which contents of ethylene carbonate, propylene carbonate, and diethyl carbonate are out of a predetermined range although the maintaining ratio slightly deteriorates as compared with that in each of Examples using the non-aqueous electrolyte compositions added with vinylene carbonate and vinylethylene carbonate.

Comparisons 1 to 6

The operation similar to that in Example 1 except that the mixture ratio of ethylene carbonate, propylene carbonate, and diethyl carbonate are set to ratios out of a predetermined range as shown in Table 1 is repeated, thereby obtaining laminate type batteries of Comparisons. A change in discharge capacitance is measured in a manner similar to the above and obtained results are shown in Table 1.

As shown in Table 1, by using the non-aqueous solvent in which the mixture ratio of ethylene carbonate, propylene carbonate, and diethyl carbonate is out of the predetermined range, the charge/discharge capacitance maintaining ratio obtained after completion of 100 cycles deteriorates as compared with that in each of Examples as well as Example 1.

TABLE 1

| DIVISION | NON-AQUEOUS SOLVENT | | | CYCLIC CARBONIC ESTER HAVING DOUBLE BOND | | DISCHARGE CAPACITANCE MAINTAINING RATIO |
|---|---|---|---|---|---|---|
| | EC (%) | PC (%) | DEC (%) | VC (%) | VEC (%) | (%) |
| EXAMPLE 1 | 30 | 9 | 60 | 1 | 0 | 94.7 |
| EXAMPLE 2 | 40 | 9 | 50 | 1 | 0 | 93.7 |
| EXAMPLE 3 | 50 | 9 | 40 | 1 | 0 | 94.8 |
| EXAMPLE 4 | 47 | 2 | 50 | 1 | 0 | 93.6 |
| EXAMPLE 5 | 57 | 2 | 40 | 1 | 0 | 93.9 |
| EXAMPLE 6 | 25 | 9 | 65 | 1 | 0 | 94.1 |
| EXAMPLE 7 | 20 | 9 | 70 | 1 | 0 | 93.5 |
| EXAMPLE 8 | 10 | 9 | 80 | 1 | 0 | 93.1 |
| EXAMPLE 9 | 5 | 9 | 85 | 1 | 0 | 92.7 |
| EXAMPLE 10 | 40 | 19 | 40 | 1 | 0 | 94.5 |
| EXAMPLE 11 | 30 | 19 | 50 | 1 | 0 | 95.0 |
| EXAMPLE 12 | 20 | 19 | 60 | 1 | 0 | 95.7 |
| EXAMPLE 13 | 10 | 19 | 70 | 1 | 0 | 92.4 |
| EXAMPLE 14 | 5 | 19 | 75 | 1 | 0 | 92.4 |
| EXAMPLE 15 | 30 | 29 | 40 | 1 | 0 | 94.9 |
| EXAMPLE 16 | 20 | 29 | 50 | 1 | 0 | 96.7 |

TABLE 1-continued

| | NON-AQUEOUS SOLVENT | | | CYCLIC CARBONIC ESTER HAVING DOUBLE BOND | | DISCHARGE CAPACITANCE MAINTAINING RATIO |
|---|---|---|---|---|---|---|
| DIVISION | EC (%) | PC (%) | DEC (%) | VC (%) | VEC (%) | (%) |
| EXAMPLE 17 | 10 | 29 | 60 | 1 | 0 | 94.2 |
| EXAMPLE 18 | 5 | 29 | 65 | 1 | 0 | 93.2 |
| EXAMPLE 19 | 20 | 39 | 40 | 1 | 0 | 94.9 |
| EXAMPLE 20 | 10 | 39 | 50 | 1 | 0 | 92.6 |
| EXAMPLE 21 | 5 | 39 | 55 | 1 | 0 | 92.3 |
| EXAMPLE 22 | 30 | 9.9 | 60 | 0.1 | 0 | 94.3 |
| EXAMPLE 23 | 20 | 9.9 | 70 | 0.1 | 0 | 92.3 |
| EXAMPLE 24 | 40 | 19.9 | 40 | 0.1 | 0 | 93.4 |
| EXAMPLE 25 | 30 | 29.9 | 40 | 0.1 | 0 | 93.2 |
| EXAMPLE 26 | 20 | 39.9 | 40 | 0.1 | 0 | 93.3 |
| EXAMPLE 27 | 30 | 8 | 60 | 2 | 0 | 94.2 |
| EXAMPLE 28 | 20 | 8 | 70 | 2 | 0 | 93.2 |
| EXAMPLE 29 | 40 | 18 | 40 | 2 | 0 | 94.3 |
| EXAMPLE 30 | 30 | 28 | 40 | 2 | 0 | 95.3 |
| EXAMPLE 31 | 20 | 38 | 40 | 2 | 0 | 94.9 |
| EXAMPLE 32 | 30 | 9.9 | 60 | 0 | 0.1 | 94.5 |
| EXAMPLE 33 | 20 | 9.9 | 70 | 0 | 0.1 | 93.2 |
| EXAMPLE 34 | 40 | 19.9 | 40 | 0 | 0.1 | 94.3 |
| EXAMPLE 35 | 30 | 29.9 | 40 | 0 | 0.1 | 94.6 |
| EXAMPLE 36 | 20 | 39.9 | 40 | 0 | 0.1 | 94.4 |
| EXAMPLE 37 | 30 | 8 | 60 | 0 | 2 | 95.3 |
| EXAMPLE 38 | 20 | 8 | 70 | 0 | 2 | 94.7 |
| EXAMPLE 39 | 40 | 18 | 40 | 0 | 2 | 94.8 |
| EXAMPLE 40 | 30 | 28 | 40 | 0 | 2 | 94.3 |
| EXAMPLE 41 | 20 | 38 | 40 | 0 | 2 | 95.2 |
| EXAMPLE 42 | 20 | 10 | 70 | 0 | 0 | 85.7 |
| EXAMPLE 43 | 20 | 7.8 | 70 | 2.2 | 0 | 86.5 |
| EXAMPLE 44 | 20 | 7.8 | 70 | 0 | 2.2 | 87.9 |
| COMPARISON 1 | 58 | 0 | 40 | 1 | 1 | 66.3 |
| COMPARISON 2 | 5 | 0 | 93 | 1 | 1 | 56.3 |
| COMPARISON 3 | 20 | 40 | 38 | 1 | 1 | 79.3 |
| COMPARISON 4 | 17 | 41 | 40 | 1 | 1 | 76.1 |
| COMPARISON 5 | 4 | 40 | 54 | 1 | 1 | 52.2 |
| COMPARISON 6 | 5 | 41 | 52 | 1 | 1 | 53.9 |

Examples 45 to 88

The operation similar to that in each of Examples shown in Table 1 except that polyvinyl formal of 1% is added to the non-aqueous electrolyte compositions and the compositions are swelled is repeated, thereby obtaining laminate type batteries of Examples 45 to 88. A change in discharge capacitance is measured in a manner similar to the above and obtained results are shown in Table 2.

As shown in Table 2, even in the case where the high molecular compound like polyvinyl formal have been added into the non-aqueous electrolyte compositions, by using the non-aqueous electrolyte compositions using the non-aqueous solvent containing ethylene carbonate, propylene carbonate, and diethyl carbonate at the ratio within a predetermined range, the charge/discharge capacitance maintaining ratio obtained after completion of 100 cycles is improved as compared with that in Comparison 7 using the non-aqueous solvent in which propylene carbonate is not contained as will be explained hereinafter.

Comparisons 7 to 12

The operation similar to that in each of Comparisons shown in Table 1 except that polyvinyl formal of 1% is added to the non-aqueous electrolyte compositions and the compositions are swelled is repeated, thereby obtaining laminate type batteries of Comparisons 7 to 12. A change in discharge capacitance is measured in a manner similar to the above and obtained results are shown in Table 2.

As shown in Table 2, by using the non-aqueous solvent in which the mixture ratio of ethylene carbonate, propylene carbonate, and diethyl carbonate is out of the predetermined range, the charge/discharge capacitance maintaining ratio obtained after completion of 100 cycles deteriorates as compared with that in each of Examples as well as Example 45.

TABLE 2

| | NON-AQUEOUS SOLVENT | | | CYCLIC CARBONIC ESTER HAVING DOUBLE BOND | | DISCHARGE CAPACITANCE MAINTAINING RATIO |
|---|---|---|---|---|---|---|
| DIVISION | EC (%) | PC (%) | DEC (%) | VC (%) | VEC (%) | (%) |
| EXAMPLE 45 | 30 | 9 | 60 | 1 | 0 | 95.2 |
| EXAMPLE 46 | 40 | 9 | 50 | 1 | 0 | 95.7 |

TABLE 2-continued

| DIVISION | NON-AQUEOUS SOLVENT | | | CYCLIC CARBONIC ESTER HAVING DOUBLE BOND | | DISCHARGE CAPACITANCE MAINTAINING RATIO |
|---|---|---|---|---|---|---|
| | EC (%) | PC (%) | DEC (%) | VC (%) | VEC (%) | (%) |
| EXAMPLE 47 | 50 | 9 | 40 | 1 | 0 | 95.8 |
| EXAMPLE 48 | 47 | 2 | 50 | 1 | 0 | 94.6 |
| EXAMPLE 49 | 57 | 2 | 40 | 1 | 0 | 94.5 |
| EXAMPLE 50 | 25 | 9 | 65 | 1 | 0 | 95.3 |
| EXAMPLE 51 | 20 | 9 | 70 | 1 | 0 | 94.4 |
| EXAMPLE 52 | 10 | 9 | 80 | 1 | 0 | 94.0 |
| EXAMPLE 53 | 5 | 9 | 85 | 1 | 0 | 92.9 |
| EXAMPLE 54 | 40 | 19 | 40 | 1 | 0 | 96.0 |
| EXAMPLE 55 | 30 | 19 | 50 | 1 | 0 | 96.5 |
| EXAMPLE 56 | 20 | 19 | 60 | 1 | 0 | 96.2 |
| EXAMPLE 57 | 10 | 19 | 70 | 1 | 0 | 93.8 |
| EXAMPLE 58 | 5 | 19 | 75 | 1 | 0 | 93.0 |
| EXAMPLE 59 | 30 | 29 | 40 | 1 | 0 | 96.5 |
| EXAMPLE 60 | 20 | 29 | 50 | 1 | 0 | 96.7 |
| EXAMPLE 61 | 10 | 29 | 60 | 1 | 0 | 94.9 |
| EXAMPLE 62 | 5 | 29 | 65 | 1 | 0 | 92.2 |
| EXAMPLE 63 | 20 | 39 | 40 | 1 | 0 | 95.7 |
| EXAMPLE 64 | 10 | 39 | 50 | 1 | 0 | 93.1 |
| EXAMPLE 65 | 5 | 39 | 55 | 1 | 0 | 92.0 |
| EXAMPLE 66 | 30 | 9.9 | 60 | 0.1 | 0 | 95.0 |
| EXAMPLE 67 | 20 | 9.9 | 70 | 0.1 | 0 | 94.2 |
| EXAMPLE 68 | 40 | 19.9 | 40 | 0.1 | 0 | 95.5 |
| EXAMPLE 69 | 30 | 29.9 | 40 | 0.1 | 0 | 96.1 |
| EXAMPLE 70 | 20 | 39.9 | 40 | 0.1 | 0 | 95.5 |
| EXAMPLE 71 | 30 | 8 | 60 | 2 | 0 | 95.5 |
| EXAMPLE 72 | 20 | 8 | 70 | 2 | 0 | 94.9 |
| EXAMPLE 73 | 40 | 18 | 40 | 2 | 0 | 95.8 |
| EXAMPLE 74 | 30 | 28 | 40 | 2 | 0 | 96.3 |
| EXAMPLE 75 | 20 | 38 | 40 | 2 | 0 | 95.7 |
| EXAMPLE 76 | 30 | 9.9 | 60 | 0 | 0.1 | 95.2 |
| EXAMPLE 77 | 20 | 9.9 | 70 | 0 | 0.1 | 94.2 |
| EXAMPLE 78 | 40 | 19.9 | 40 | 0 | 0.1 | 95.6 |
| EXAMPLE 79 | 30 | 29.9 | 40 | 0 | 0.1 | 96.5 |
| EXAMPLE 80 | 20 | 39.9 | 40 | 0 | 0.1 | 95.8 |
| EXAMPLE 81 | 30 | 8 | 60 | 0 | 2 | 95.2 |
| EXAMPLE 82 | 20 | 8 | 70 | 0 | 2 | 94.5 |
| EXAMPLE 83 | 40 | 18 | 40 | 0 | 2 | 95.8 |
| EXAMPLE 84 | 30 | 28 | 40 | 0 | 2 | 96.9 |
| EXAMPLE 85 | 20 | 38 | 40 | 0 | 2 | 96.0 |
| EXAMPLE 86 | 20 | 10 | 70 | 0 | 0 | 84.7 |
| EXAMPLE 87 | 20 | 7.8 | 70 | 2.2 | 0 | 87.8 |
| EXAMPLE 88 | 20 | 7.8 | 70 | 0 | 2.2 | 87.9 |
| COMPARISON 7 | 58 | 0 | 40 | 1 | 1 | 76.3 |
| COMPARISON 8 | 5 | 0 | 93 | 1 | 1 | 53.9 |
| COMPARISON 9 | 20 | 40 | 38 | 1 | 1 | 78.7 |
| COMPARISON 10 | 17 | 41 | 40 | 1 | 1 | 76.0 |
| COMPARISON 11 | 4 | 40 | 54 | 1 | 1 | 53.8 |
| COMPARISON 12 | 5 | 41 | 52 | 1 | 1 | 55.1 |

Examples 89 to 132

The operation similar to that in each of Examples shown in Table 1 except that polyacrylic acid ester of 1% is added to the non-aqueous electrolyte compositions and the compositions are swelled is repeated, thereby obtaining laminate type batteries of Examples 89 to 132. A change in discharge capacitance is measured in a manner similar to the above and obtained results are shown in Table 3.

As shown in Table 3, by using the non-aqueous electrolyte compositions using the non-aqueous solvent containing ethylene carbonate, propylene carbonate, and diethyl carbonate at the ratio within a predetermined range, the charge/discharge capacitance maintaining ratio obtained after completion of 100 cycles is improved as compared with that in Comparison 13 using the non-aqueous solvent in which propylene carbonate is not contained as will be explained hereinafter.

Comparisons 13 to 18

The operation similar to that in each of Comparisons shown in Table 1 except that polyacrylic acid ester of 1% is added to the non-aqueous electrolyte compositions and the compositions are swelled is repeated, thereby obtaining laminate type batteries of Comparisons 13 to 18. A change in discharge capacitance is measured in a manner similar to the above and obtained results are shown in Table 3.

As shown in Table 3, by using the non-aqueous solvent in which the mixture ratio of ethylene carbonate, propylene carbonate, and diethyl carbonate is out of the predetermined range, the charge/discharge capacitance maintaining ratio obtained after completion of 100 cycles deteriorates as compared with that in each of Examples as well as Example 89.

TABLE 3

| DIVISION | NON-AQUEOUS SOLVENT | | | CYCLIC CARBONIC ESTER HAVING DOUBLE BOND | | DISCHARGE CAPACITANCE MAINTAINING RATIO |
| --- | --- | --- | --- | --- | --- | --- |
| | EC (%) | PC (%) | DEC (%) | VC (%) | VEC (%) | (%) |
| EXAMPLE 89 | 30 | 9 | 60 | 1 | 0 | 94.7 |
| EXAMPLE 90 | 40 | 9 | 50 | 1 | 0 | 94.7 |
| EXAMPLE 91 | 50 | 9 | 40 | 1 | 0 | 94.8 |
| EXAMPLE 92 | 47 | 2 | 50 | 1 | 0 | 94.6 |
| EXAMPLE 93 | 57 | 2 | 40 | 1 | 0 | 94.1 |
| EXAMPLE 94 | 25 | 9 | 65 | 1 | 0 | 94.0 |
| EXAMPLE 95 | 20 | 9 | 70 | 1 | 0 | 93.7 |
| EXAMPLE 96 | 10 | 9 | 80 | 1 | 0 | 93.0 |
| EXAMPLE 97 | 5 | 9 | 85 | 1 | 0 | 92.3 |
| EXAMPLE 98 | 40 | 19 | 40 | 1 | 0 | 95.0 |
| EXAMPLE 99 | 30 | 19 | 50 | 1 | 0 | 95.5 |
| EXAMPLE 100 | 20 | 19 | 60 | 1 | 0 | 95.5 |
| EXAMPLE 101 | 10 | 19 | 70 | 1 | 0 | 93.1 |
| EXAMPLE 102 | 5 | 19 | 75 | 1 | 0 | 92.9 |
| EXAMPLE 103 | 30 | 29 | 40 | 1 | 0 | 96.6 |
| EXAMPLE 104 | 20 | 29 | 50 | 1 | 0 | 96.5 |
| EXAMPLE 105 | 10 | 29 | 60 | 1 | 0 | 93.9 |
| EXAMPLE 106 | 5 | 29 | 65 | 1 | 0 | 93.2 |
| EXAMPLE 107 | 20 | 39 | 40 | 1 | 0 | 94.9 |
| EXAMPLE 108 | 10 | 39 | 50 | 1 | 0 | 94.6 |
| EXAMPLE 109 | 5 | 39 | 55 | 1 | 0 | 91.8 |
| EXAMPLE 110 | 30 | 9.9 | 60 | 0.1 | 0 | 94.2 |
| EXAMPLE 111 | 20 | 9.9 | 70 | 0.1 | 0 | 93.5 |
| EXAMPLE 112 | 40 | 19.9 | 40 | 0.1 | 0 | 94.9 |
| EXAMPLE 113 | 30 | 29.9 | 40 | 0.1 | 0 | 96.0 |
| EXAMPLE 114 | 20 | 39.9 | 40 | 0.1 | 0 | 94.6 |
| EXAMPLE 115 | 30 | 8 | 60 | 2 | 0 | 94.6 |
| EXAMPLE 116 | 20 | 8 | 70 | 2 | 0 | 93.6 |
| EXAMPLE 117 | 40 | 18 | 40 | 2 | 0 | 95.3 |
| EXAMPLE 118 | 30 | 28 | 40 | 2 | 0 | 96.0 |
| EXAMPLE 119 | 20 | 38 | 40 | 2 | 0 | 95.0 |
| EXAMPLE 120 | 30 | 9.9 | 60 | 0 | 0.1 | 94.3 |
| EXAMPLE 121 | 20 | 9.9 | 70 | 0 | 0.1 | 93.8 |
| EXAMPLE 122 | 40 | 19.9 | 40 | 0 | 0.1 | 95.0 |
| EXAMPLE 123 | 30 | 29.9 | 40 | 0 | 0.1 | 96.5 |
| EXAMPLE 124 | 20 | 39.9 | 40 | 0 | 0.1 | 94.9 |
| EXAMPLE 125 | 30 | 8 | 60 | 0 | 2 | 94.3 |
| EXAMPLE 126 | 20 | 8 | 70 | 0 | 2 | 93.7 |
| EXAMPLE 127 | 40 | 18 | 40 | 0 | 2 | 95.1 |
| EXAMPLE 128 | 30 | 28 | 40 | 0 | 2 | 96.6 |
| EXAMPLE 129 | 20 | 38 | 40 | 0 | 2 | 95.0 |
| EXAMPLE 130 | 20 | 10 | 70 | 0 | 0 | 85.8 |
| EXAMPLE 131 | 20 | 7.8 | 70 | 2.2 | 0 | 87.0 |
| EXAMPLE 132 | 20 | 7.8 | 70 | 0 | 2.2 | 87.5 |
| COMPARISON 13 | 58 | 0 | 40 | 1 | 1 | 73.6 |
| COMPARISON 14 | 5 | 0 | 93 | 1 | 1 | 58.7 |
| COMPARISON 15 | 20 | 40 | 38 | 1 | 1 | 74.6 |
| COMPARISON 16 | 17 | 41 | 40 | 1 | 1 | 73.2 |
| COMPARISON 17 | 4 | 40 | 54 | 1 | 1 | 53.9 |
| COMPARISON 18 | 5 | 41 | 52 | 1 | 1 | 63.0 |

Examples 133 to 176

By using non-aqueous electrolyte compositions similar to those in each of Examples shown in Table 1 except that a separator in which a thickness is set to 10 μm and both surfaces are coated with polyvinylidene fluoride so as to respectively have a thickness of 2 μm is used, laminate type batteries of Examples 133 to 176 are obtained. A change in discharge capacitance is measured in a manner similar to the above and obtained results are shown in Table 4.

As shown in Table 4, by using the non-aqueous electrolyte compositions using the non-aqueous solvent containing ethylene carbonate, propylene carbonate, and diethyl carbonate at the ratio within a predetermined range, the charge/discharge capacitance maintaining ratio obtained after completion of 100 cycles is improved as compared with that in Comparison 19 using the non-aqueous solvent in which propylene carbonate is not contained as will be explained hereinafter.

Comparisons 19 to 24

By using non-aqueous electrolyte compositions similar to those in each of Comparisons shown in Table 1 except that a separator in which a thickness is set to 10 μm and both surfaces are coated with polyvinylidene fluoride so as to respectively have a thickness of 2 μm is used, laminate type batteries of Comparisons 19 to 24 are obtained. A change in discharge capacitance is measured in a manner similar to the above and obtained results are shown in Table 4.

As shown in Table 4, by using the non-aqueous solvent in which the mixture ratio of ethylene carbonate, propylene carbonate, and diethyl carbonate is out of the predetermined range, the charge/discharge capacitance maintaining ratio obtained after completion of 100 cycles deteriorates as compared with that in each of Examples as well as Example 133.

TABLE 4

| DIVISION | NON-AQUEOUS SOLVENT | | | CYCLIC CARBONIC ESTER HAVING DOUBLE BOND | | DISCHARGE CAPACITANCE MAINTAINING RATIO |
|---|---|---|---|---|---|---|
| | EC (%) | PC (%) | DEC (%) | VC (%) | VEC (%) | (%) |
| EXAMPLE 133 | 30 | 9 | 60 | 1 | 0 | 97.4 |
| EXAMPLE 134 | 40 | 9 | 50 | 1 | 0 | 96.6 |
| EXAMPLE 135 | 50 | 9 | 40 | 1 | 0 | 96.8 |
| EXAMPLE 136 | 47 | 2 | 50 | 1 | 0 | 95.6 |
| EXAMPLE 137 | 57 | 2 | 40 | 1 | 0 | 95.2 |
| EXAMPLE 138 | 25 | 9 | 65 | 1 | 0 | 96.0 |
| EXAMPLE 139 | 20 | 9 | 70 | 1 | 0 | 95.3 |
| EXAMPLE 140 | 10 | 9 | 80 | 1 | 0 | 94.9 |
| EXAMPLE 141 | 5 | 9 | 85 | 1 | 0 | 94.4 |
| EXAMPLE 142 | 40 | 19 | 40 | 1 | 0 | 95.9 |
| EXAMPLE 143 | 30 | 19 | 50 | 1 | 0 | 96.8 |
| EXAMPLE 144 | 20 | 19 | 60 | 1 | 0 | 97.4 |
| EXAMPLE 145 | 10 | 19 | 70 | 1 | 0 | 95.0 |
| EXAMPLE 146 | 5 | 19 | 75 | 1 | 0 | 94.2 |
| EXAMPLE 147 | 30 | 29 | 40 | 1 | 0 | 96.7 |
| EXAMPLE 148 | 20 | 29 | 50 | 1 | 0 | 97.5 |
| EXAMPLE 149 | 10 | 29 | 60 | 1 | 0 | 94.8 |
| EXAMPLE 150 | 5 | 29 | 65 | 1 | 0 | 94.2 |
| EXAMPLE 151 | 20 | 39 | 40 | 1 | 0 | 96.5 |
| EXAMPLE 152 | 10 | 39 | 50 | 1 | 0 | 94.3 |
| EXAMPLE 153 | 5 | 39 | 55 | 1 | 0 | 93.7 |
| EXAMPLE 154 | 30 | 9.9 | 60 | 0.1 | 0 | 96.9 |
| EXAMPLE 155 | 20 | 9.9 | 70 | 0.1 | 0 | 95.1 |
| EXAMPLE 156 | 40 | 19.9 | 40 | 0.1 | 0 | 95.4 |
| EXAMPLE 157 | 30 | 29.9 | 40 | 0.1 | 0 | 96.0 |
| EXAMPLE 158 | 20 | 39.9 | 40 | 0.1 | 0 | 95.8 |
| EXAMPLE 159 | 30 | 8 | 60 | 2 | 0 | 97.0 |
| EXAMPLE 160 | 20 | 8 | 70 | 2 | 0 | 95.5 |
| EXAMPLE 161 | 40 | 18 | 40 | 2 | 0 | 95.8 |
| EXAMPLE 162 | 30 | 28 | 40 | 2 | 0 | 96.5 |
| EXAMPLE 163 | 20 | 38 | 40 | 2 | 0 | 96.2 |
| EXAMPLE 164 | 30 | 9.9 | 60 | 0 | 0.1 | 96.8 |
| EXAMPLE 165 | 20 | 9.9 | 70 | 0 | 0.1 | 95.8 |
| EXAMPLE 166 | 40 | 19.9 | 40 | 0 | 0.1 | 95.8 |
| EXAMPLE 167 | 30 | 29.9 | 40 | 0 | 0.1 | 96.3 |
| EXAMPLE 168 | 20 | 39.9 | 40 | 0 | 0.1 | 96.2 |
| EXAMPLE 169 | 30 | 8 | 60 | 0 | 2 | 97.2 |
| EXAMPLE 170 | 20 | 8 | 70 | 0 | 2 | 96.1 |
| EXAMPLE 171 | 40 | 18 | 40 | 0 | 2 | 97.0 |
| EXAMPLE 172 | 30 | 28 | 40 | 0 | 2 | 97.0 |
| EXAMPLE 173 | 20 | 38 | 40 | 0 | 2 | 96.7 |
| EXAMPLE 174 | 20 | 10 | 70 | 0 | 0 | 86.6 |
| EXAMPLE 175 | 20 | 7.8 | 70 | 2.2 | 0 | 87.2 |
| EXAMPLE 176 | 20 | 7.8 | 70 | 0 | 2.2 | 88.6 |
| COMPARISON 19 | 58 | 0 | 40 | 1 | 1 | 76.3 |
| COMPARISON 20 | 5 | 0 | 93 | 1 | 1 | 59.0 |
| COMPARISON 21 | 20 | 40 | 38 | 1 | 1 | 70.3 |
| COMPARISON 22 | 17 | 41 | 40 | 1 | 1 | 68.8 |
| COMPARISON 23 | 4 | 40 | 54 | 1 | 1 | 59.3 |
| COMPARISON 24 | 5 | 41 | 52 | 1 | 1 | 63.9 |

Examples 177 to 197

The operation similar to that in each of Examples 1 to 21 shown in Table 1 except that polyethylene glycol diacrylate . . . (6) of 1% as a polymerization compound having an ether radical expressed by the following chemical formula 4 is added to the non-aqueous electrolyte compositions and the compositions are swelled is repeated, thereby obtaining laminate type batteries of Examples 177 to 197 are obtained.

[Chemical Formula 4]

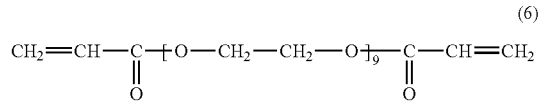

(6)

A change in discharge capacitance is measured in a manner similar to the above and obtained results are shown in Table 5.

As shown in Table 5, by using the polymerization compound having the ether radical, the charge/discharge capacitance maintaining ratio obtained after completion of 100 cycles deteriorates as compared with that in each of Examples 1 to 21. This is because the lithium ions are oriented to the ether radical and mobility deteriorates. It has been confirmed that it is preferable to use the high molecular compound such as polyvinyl formal, polyacrylic acid ester, polyvinylidene fluoride, or the like mentioned above.

TABLE 5

| DIVISION | NON-AQUEOUS SOLVENT | | | CYCLIC CARBONIC ESTER HAVING DOUBLE BOND | | DISCHARGE CAPACITANCE MAINTAINING RATIO |
|---|---|---|---|---|---|---|
| | EC (%) | PC (%) | DEC (%) | VC (%) | VEC (%) | (%) |
| EXAMPLE 177 | 30 | 9 | 60 | 1 | 0 | 76.3 |
| EXAMPLE 178 | 40 | 9 | 50 | 1 | 0 | 73.9 |
| EXAMPLE 179 | 50 | 9 | 40 | 1 | 0 | 75.5 |
| EXAMPLE 180 | 47 | 2 | 50 | 1 | 0 | 73.4 |
| EXAMPLE 181 | 57 | 2 | 40 | 1 | 0 | 75.2 |
| EXAMPLE 182 | 25 | 9 | 65 | 1 | 0 | 73.1 |
| EXAMPLE 183 | 20 | 9 | 70 | 1 | 0 | 75.9 |
| EXAMPLE 184 | 10 | 9 | 80 | 1 | 0 | 63.6 |
| EXAMPLE 185 | 5 | 9 | 85 | 1 | 0 | 50.9 |
| EXAMPLE 186 | 40 | 19 | 40 | 1 | 0 | 73.8 |
| EXAMPLE 187 | 30 | 19 | 50 | 1 | 0 | 77.3 |
| EXAMPLE 188 | 20 | 19 | 60 | 1 | 0 | 74.8 |
| EXAMPLE 189 | 10 | 19 | 70 | 1 | 0 | 66.3 |
| EXAMPLE 190 | 5 | 19 | 75 | 1 | 0 | 53.7 |
| EXAMPLE 191 | 30 | 29 | 40 | 1 | 0 | 75.7 |
| EXAMPLE 192 | 20 | 29 | 50 | 1 | 0 | 73.5 |
| EXAMPLE 193 | 10 | 29 | 60 | 1 | 0 | 65.7 |
| EXAMPLE 194 | 15 | 29 | 65 | 1 | 0 | 45.7 |
| EXAMPLE 195 | 20 | 39 | 40 | 1 | 0 | 63.5 |
| EXAMPLE 196 | 10 | 39 | 50 | 1 | 0 | 50.3 |
| EXAMPLE 197 | 5 | 39 | 55 | 1 | 0 | 43.8 |

Although the embodiments have been described above with respect to the Examples, the embodiments are not limited to them but various modifications are possible.

For example, although the embodiments have been described above with respect to the case where the battery has the battery element 20 in which the cathode 21 and the anode 22 have been laminated and wound, the embodiments can be also applied to the case where the battery has a flat battery element in which a pair of cathode and anode have been laminated or a laminate type battery element in which a plurality of cathodes and anodes have been laminated.

Although the embodiments have been described above with respect to the case of using the film-shaped sheathing member 30, the embodiments can be similarly applied to a battery using a can as a sheathing member, that is, a battery having another shape such as cylindrical shape, rectangular shape, coin shape, button shape, or the like. Further, the embodiments are not limited to the secondary battery but can be also applied to a primary battery.

Moreover, Although the embodiments relate to the battery using lithium as an electrode reactive material, the technical idea of the embodiments can be also applied to the case of using another alkali metal such as sodium (Na), potassium (K), or the like, alkaline earth metal such as magnesium (Mg), calcium (Ca), or the like, or another light metal such as aluminum or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte composition comprising:
an electrolytic salt;
a non-aqueous solvent containing ethylene carbonate having a mass ratio ranging from 5% or more to less than 60%, propylene carbonate having a mass ratio of greater than 0% and less than 40%, and diethyl carbonate having a mass ratio of 40% to 70% as a mass ratio, respectively;
an unsaturated cyclic carbonic ester, wherein the unsaturated cyclic carbonic ester is vinylethylene carbonate; and
a high molecular compound wherein said high molecular compound is at least one kind selected from the group consisting of polyvinyl formal, polyacrylic acid ester, and polyvinylidene fluoride,
wherein the vinylethylene carbonate included in the non-aqueous solvent is in an amount ranging from 0.1 to 2% as a mass ratio, and
wherein the mass ratio of the ethylene carbonate, the propylene carbonate, the diethyl carbonate, and vinylethylene carbonate total 100% of the mass of the non-aqueous solvent.

2. A non-aqueous electrolyte secondary battery comprising:
a cathode containing cathode active material and an anode containing anode active material, each active material capable of doping and dedoping lithium ions;
a non-aqueous electrolyte composition;
a separator; and
a sheathing member enclosing the cathode, the anode, the non-aqueous electrolyte compositions, and the separator,
wherein the non-aqueous electrolyte composition includes:
an electrolytic salt;
a non-aqueous solvent including ethylene carbonate having a mass ratio ranging from 5% or more to less than 60%, propylene carbonate having a mass ratio of greater than 0% and less than 40%, and diethyl carbonate having a mass ratio of 40% to 70%;
an unsaturated cyclic carbonic ester wherein the unsaturated cyclic carbonic ester is vinylethylene carbonate, and wherein the unsaturated cyclic carbonic ester is included in the non-aqueous solvent in an amount ranging from 0.1 to 2% as a mass ratio; and a high molecular compound wherein said high molecular compound is at least one kind selected from the group consisting of polyvinyl formal, polyacrylic acid ester, and polyvinylidene fluoride, wherein the mass ratio of the ethylene carbonate, the propylene carbonate, the diethyl carbonate, and vinylethylene carbonate total 100% of the mass of the non-aqueous solvent.

3. A non-aqueous electrolyte secondary battery according to claim 2, wherein the sheathing member comprises a laminate film.

4. A non-aqueous electrolyte secondary battery according to claim 2, wherein the separator is coated with polyvinylidene fluoride.

* * * * *